United States Patent
Sixt et al.

(10) Patent No.: US 7,094,858 B2
(45) Date of Patent: Aug. 22, 2006

(54) PROCESS FOR THE PREPARATION OF CROSSLINKABLE MATERIALS BASED ON ORGANOSILICON COMPOUNDS

(75) Inventors: Torsten Sixt, Mehring (DE); Franz Neuhauser, Geretsberg (DE)

(73) Assignee: Wacker-Chemie GmbH, Munich (DE)

( * ) Notice: Subject to any disclaimer, the term of this patent is extended or adjusted under 35 U.S.C. 154(b) by 167 days.

(21) Appl. No.: 10/833,671

(22) Filed: Apr. 28, 2004

(65) Prior Publication Data

US 2004/0220331 A1 Nov. 4, 2004

(30) Foreign Application Priority Data

Apr. 29, 2003 (DE) ................ 103 19 303

(51) Int. Cl.
*C08G 77/06* (2006.01)
*C08G 77/08* (2006.01)

(52) U.S. Cl. .......................... 528/18; 528/34
(58) Field of Classification Search ............ 528/18, 528/34
See application file for complete search history.

(56) References Cited

U.S. PATENT DOCUMENTS

| 3,383,355 | A | | 5/1968 | Kenneth |
| 4,528,324 | A | | 7/1985 | Chung et al. |
| 4,895,918 | A | * | 1/1990 | Lucas .......................... 528/18 |
| 5,969,075 | A | | 10/1999 | Inoue |
| 6,254,811 | B1 | | 7/2001 | Finger et al. |

FOREIGN PATENT DOCUMENTS

| DE | 195 07 416 C1 | | 3/1995 |
| DE | 4 415 396 | | 11/1995 |
| EP | 0 137 883 | | 4/1985 |
| EP | 0 304 701 | | 3/1989 |
| EP | 0 553 143 | | 5/1995 |
| EP | 0 495 298 | | 2/1996 |
| EP | 0 657 517 | | 11/1998 |
| EP | 1 006 146 | | 2/2002 |
| WO | 01/83592 | * | 8/2001 |

OTHER PUBLICATIONS

English Derwent Abstract Corres. to EP 1 006 146 AN 2000-378259 [33].
High Molecular Report 1981, H. 8027/81.
Chemical Abstracts 1990, vol. 113, No. 14, 113:116035w.
High Molecular Report 1992, Ref. H. 8107/92.
High Molecular Report 1992, Ref. H. 8108/92.
English Derwent Abstract corres. to DE 4 415 396 AN 1995-383572 [50].
English Derwent Abstract AN 1996-425400 [42] corresp. to DE 19507416 C1.

* cited by examiner

*Primary Examiner*—Margaret G. Moore
(74) *Attorney, Agent, or Firm*—Brooks Kushman P.C.

(57) ABSTRACT

A Process for the preparation of materials crosslinkable with elimination of alcohols to give elastomers, wherein
(A) an organopolysiloxane having at least two hydroxyl groups,
(B) trialkoxysilanes and/or the partial hydrolysis products thereof in an amount of at least 0.7 part by weight, based on 100 parts by weight of component (A),
(C) an organosilicon compound which comprises at least one radical bonded to silicon via carbon and having basic nitrogen,
(D) a tin catalyst, optionally,
(E) fillers,
(F) stabilizers and
(G) further substances are mixed with one another, (A) and (B) forming a reaction product with elimination of alkanol, with the proviso that tin catalyst (D) is added to the component (A) or the mixture containing the reaction product thereof only when from 1 to 60% of the Si—OH groups originally present remain present.

14 Claims, No Drawings

PROCESS FOR THE PREPARATION OF CROSSLINKABLE MATERIALS BASED ON ORGANOSILICON COMPOUNDS

BACKGROUND OF THE INVENTION

1. Field of the Invention

The invention relates to a process for the preparation of materials crosslinkable with elimination of alcohols to give elastomers, i.e. RTV-1 materials, with the use of hydroxyl-terminated polydiorganosiloxanes.

2. Background Art

Processes for the preparation of materials crosslinkable at room temperature on admission of water have long been known. Typically, such materials are formulated substantially from organopolysiloxanes having at least two hydrolyzable radicals such as alkoxy groups, crosslinking agents having at least three hydrolyzable radicals, again often being alkoxy groups, and catalysts such as organotin compounds. The siloxanes used as base polymers, which are "blocked" at the end, are prepared by a so-called "endcapping" process.

Endcapping is essential for the preparation of RTV-1 materials crosslinkable with elimination of alcohols. The endcapping can take place in several ways: 1) direct compounding with organopolysiloxanes having terminal OH groups employing titanium catalysts; 1.1) in situ endcapping with orthophosphoric esters in combination with chalk, as described, for example, in DE-C-19507416; 1.2) in situ endcapping of organopolysiloxanes having terminal OH groups with the use of (alkoxy)Si—N compounds and combinations of Lewis acids and amine compounds, as described, for example, in EP-A-137883; and 1.3) in situ endcapping with the use of trialkoxysilanes and carboxamides or salts thereof, as disclosed in EP-A-304701; thereafter, the materials are further compounded. 2) Separate preparation of special polymers which are endcapped. 3) Compounding of hydroxyl-terminated organopolysiloxanes with alkoxysil(ox)ane and solid catalysts at elevated temperature, the solid catalysts being subsequently removed, as described, for example, in U.S. Pat. No. 3,383,355.

SUMMARY OF THE INVENTION

The present invention is directed to RTV-1 compositions which have enhanced storage stability prepared from hydroxyl-group-containing organopolysiloxanes, alkoxysilanes, and tin catalyst, wherein the tin catalyst is not compounded with the aforementioned ingredients until the hydroxyl content of the composition is lowered to between 1% and 60% of those initially present.

DETAILED DESCRIPTION OF THE PREFERRED EMBODIMENT(S)

The present invention thus relates to a process for the preparation of materials crosslinkable with elimination of alcohols to give elastomers, wherein (A) one or more organopolysiloxanes having at least two hydroxyl groups, (B) one or more silanes of the formula $$RSi(OR^1)_3 \qquad (I),$$

in which each R is a methyl or vinyl radical and each $R^1$ is a methyl or ethyl radical, and/or the partial hydrolysis products thereof, with the proviso that silanes of the formula (I) and/or the partial hydrolysis products thereof are employed in amounts of at least 0.7 part by weight, based on 100 parts by weight of component (A), (C) an organosilicon compound which has at least one radical bonded to silicon via carbon, said radical further comprising basic nitrogen, (D) a tin catalyst, (E) optionally fillers, (F) optionally stabilizers, and (G) optionally further substances are mixed with one another, (A) and (B) forming a reaction product with elimination of alkanol, with the proviso that the tin catalyst (D) is added to the component (A) or the mixture containing the reaction product thereof only when from 1 to 60% of the Si—OH groups originally present remain present.

Component (A) preferably comprises substantially linear organopolysiloxanes terminated with hydroxyl groups, most preferably those of the formula $$HO-[R^2{}_2SiO]_m-H \qquad (II),$$

in which each $R^2$ may be an identical or different optionally substituted hydrocarbon radical, and m is chosen so that the organopolysiloxane (A) has a viscosity of from 100 to 1,000,000 mPa·s, in particular from 500 to 250,000 mpa·s, at 25° C. Radical $R^2$ preferably comprises alkyl groups having 1 to 6 carbon atoms, most preferably the methyl radical.

Component (B) is preferably vinyltrimethoxysilane. For the preparation of the crosslinkable materials, component (B) is preferably used in amounts of preferably at least 1 part by weight, more preferably from 1.5 to 8.5 parts by weight, based in each case on 100 parts by weight of component (A).

Component (C) preferably comprises organosiloxanes and organosilanes which comprise at least one basic nitrogen radical bonded to silicon via carbon, aminosilanes such as γ-aminopropyltrimethoxysilane, aminomethyltriethoxysilane and γ-ethylenaminopropylaminotrimethoxysilane being particularly preferred. In the process according to the invention, component (C) is preferably used in amounts of from 0.5 to 8.0 parts by weight, more preferably from 1.5 to 5.5 parts by weight, based in each case on 100 parts by weight of siloxane A.

Component (D) preferably comprises organotin compounds such as di-n-butyltin diacetate, di-n-butyltin octanoate, di-n-butyltin dilaurate or di-n-butyltin oxide, and the reaction products thereof with (poly)alkoxysilanes, these latter reaction product catalysts being particularly preferred. In the process according to the invention, component (D) is preferably used in amounts of from 0.01 to 3.0 parts by weight, more preferably from 0.01 to 1.0 part by weight, and in particular from 0.05 to 0.5 part by weight, based in each case on 100 parts by weight of crosslinkable material.

In the process according to the invention, all fillers which are useful for the preparation of RTV-1 materials can be used as fillers (E). Examples of fillers (E) are nonreinforcing fillers, i.e. fillers having a BET surface area of up to 50 m²/g, such as quartz, diatomaceous earth, calcium silicate, zirconium silicate, zeolites, metal oxide powder, such as aluminum, titanium, iron or zinc oxides or mixed oxides thereof, barium sulfate, calcium carbonate, gypsum, silicon nitride, silicon carbide, boron nitride, glass powder and plastics powder, such as polyacrylonitrile powder; and reinforcing fillers, i.e. fillers having a BET surface area of more than 50 m²/g, such as silica prepared by a pyrogenic method, precipitated silica, precipitated chalk, carbon black such as furnace black and acetylene black, silicon-aluminum mixed oxides having a large BET surface area, and fibrous fillers, such as asbestos and plastics fibers. The fillers may have been rendered hydrophobic, for example by treatment with organosilanes or organosiloxanes or with stearic acid or by etherification of hydroxyl groups to alkoxy groups.

If fillers (E) are used, they are preferably pyrogenic silica, coated or uncoated calcium carbonates, metal silicates, quartz or carbon blacks. If fillers (E) are used for the preparation, of the crosslinkable materials, which is preferred, the amounts are preferably from 10 to 35 parts by weight, more preferably from 15 to 30 parts by weight, based in each case on 100 parts by weight of crosslinkable material.

In the process according to the invention, all stabilizers which are useful for the preparation of RTV-1 materials can be used as stabilizers (F). Examples of stabilizers are phosphorus compounds in all oxidation states. Component (F) preferably comprises phosphorus compounds such as phosphoric monoesters, phosphoric diesters or phosphonic acids, most preferably, octylphosphonic acid. If stabilizers (F) are used for the preparation of the crosslinkable materials, which is preferred, the amounts are preferably from 0.05 to 2.0 parts by weight, more preferably from 0.1 to 0.4 part by weight, based in each case on 100 parts by weight of crosslinkable material.

The optionally used further substances (G) include plasticizers such as dimethylpolysiloxanes which are liquid at room temperature and endcapped by trimethylsiloxy groups, in particular those having viscosities in the range between 50 and 1,000 mPa·s, and high-boiling hydrocarbons such as liquid paraffins, and additives such as pigments, dyes, fragrances, fungicides, antioxidants, compositions for influencing the electrical properties such as conductive carbon black, flame retardant compositions, light stabilizers, compositions for prolonging the skin formation time such as silanes having a SiC-bonded mercaptoalkyl radical, cell-producing compositions, e.g. azodicarboxamide, heat stabilizers, thixotropic agents such as phosphoric esters, and organic solvents such as alkylaromatics. If further substances (G) are used for the preparation of the crosslinkable materials, the amounts are preferably from 0.1 to 20 parts by weight, based on 100 parts by weight of crosslinkable material.

The components used in the inventive process are commercial products or are preparable in chemistry by customary processes. The components used in the process may be in each case one type of such a component as well as a mixture of at least two different types of such components.

For the preparation of the crosslinkable materials, all components can be mixed with one another in any desired sequence, with the proviso that tin catalyst (D) is added to the component (A) or the mixture containing the reaction product thereof, only when from 1 to 60%, preferably from 10 to 50%, more preferably from 20 to 45%, of the Si—OH groups originally present remain present. This mixing is preferably effected at a temperature of from 20 to 90° C., more preferably from 30 to 70° C., and in particular at a temperature which is established on combining the reactants at room temperature without additional heating or cooling, and at the pressure of the surrounding atmosphere, i.e. from about 900 to 1,100 hPa. If desired, this mixing can, however, also be effected at higher or lower pressures, for example at lower pressures for avoiding gas inclusions.

In a preferred embodiment of the process, component (A), component (B), component (C), optionally fillers (E) and optionally further substances (G) are mixed with one another to give a premix and then catalyst (D) and optionally stabilizer (F) are added, with the proviso that tin catalyst (D) is added to the premix only when from 1 to 60% of the Si—OH groups originally present remain present. In a particularly preferred embodiment of the process, component (A), component (C), component (B), optionally fillers (E) and optionally further substances (G) are mixed with one another in this sequence to give a premix and then catalyst (D) and optionally stabilizer (F) are added, with the proviso that tin catalyst (D) is added to the premix only when from 1 to 60% of the Si—OH groups originally present are present.

The preparation of the crosslinkable materials and the storage thereof must be effected under substantially anhydrous conditions, since otherwise the materials may cure prematurely. Preferably, the process is carried out under an inert gas atmosphere, most preferably under nitrogen.

The inventive materials can be used for all purposes for which materials storable in the absence of water and crosslinking on admission of water at room temperature to give elastomers can be used. The materials are therefore eminently suitable, for example, as stopping compounds for joints, including perpendicular joints, and similar empty spaces having, for example, an internal dimension of from 10 to 40 mm, for example of buildings, land vehicles, water vehicles and aircraft, or as adhesives or sealing compounds, for example in window construction or in the production of aquaria or showcases, and, for example, for the production of protective coatings, including those for surfaces exposed to the constant action of fresh or sea water, or antislip coatings, or of elastomeric moldings and for the insulation of electrical or electronic apparatuses. Such materials can also be used in the industrial sector, such as for the sealing of housings, controllers, plant components and engine parts, for the encapsulation of components or as a protective coating.

In the examples described below, all stated viscosities relate to a temperature of 25° C. Unless stated otherwise, the examples below are carried out at a pressure of the surrounding atmosphere, i.e. approximately at 1,000 hPa, and at room temperature, i.e. at about 23° C., or at a temperature which is established on combining the reactants at room temperature without additional heating or cooling, and at a relative humidity of about 50%. Furthermore, all parts and percentages are based on weight, unless stated otherwise.

EXAMPLE 1

The amount of α,ω-dihydroxypolydimethylsiloxane stated in Table 1 is initially introduced in the absence of water into a planetary mixer having vacuum equipment, and aminosilane and crosslinking agent are homogeneously incorporated in the stated amounts; the filler is then incorporated into the mixture and the premix thus obtained is further homogenized. Octylphosphonic acid and the tin catalyst, which is a reaction product of dibutyltin acetate and tetraethyl silicate, commercially available from Wacker-Chemie GmbH, Germany, under the name "Katalysator 41", are then added to the premix when only 47% of the Si—OH groups originally present still remain present. After homogenization in vacuo, the compound thus obtained is filled into moisture-tight containers and crosslinked after the storage time stated in Table 2. For this purpose, the compound is applied in a 2 mm thick layer to a PE film and left to stand at 23° C. and 50% relative humidity. The vulcanization is assessed as good if the material is completely vulcanized after 24 hours. The results for the vulcanization behavior are shown in table 2.

COMPARATIVE EXAMPLE 1 (C1)

The procedure described in Example 1 is repeated, with the modification that the addition of the catalyst is effected at a concentration of 69% of the initial Si—OH concentration. The results for the vulcanization behavior are shown in table 2.

EXAMPLE 2

The procedure described in Example 1 is repeated, with the modification that the starting materials and amounts stated in Table 1 are used and, in contrast to Example 1, the addition of the catalyst is effected at a concentration of 48% of the initial Si—OH concentration. The results for the vulcanization behavior are shown in table 2.

EXAMPLE 3

The procedure described in Example 1 is repeated, with the modification that the starting materials and amounts stated in Table 1 are used and, in contrast to Example 1, the addition of the catalyst is effected at a concentration of 55% of the initial Si—OH concentration. The results for the vulcanization behavior are shown in Table 2.

EXAMPLE 4

The procedure described in Example 1 is repeated, with the modification that the starting materials and amounts stated in Table 1 are used and, in contrast to Example 1, the addition of the catalyst is effected at a concentration of 42% of the initial Si—OH concentration. The results for the vulcanization behavior are shown in Table 2.

EXAMPLE 5

The procedure described in Example 1 is repeated, with the modification that the starting materials and amounts stated in Table 1 are used and, in contrast to Example 1, the addition of the catalyst is effected at a concentration of 44% of the initial Si—OH concentration. The results for the vulcanization behavior are shown in Table 2.

TABLE 2

| Vulcanization | After preparation | After 1 day | After heat storage for 3 weeks at 50° C. |
|---|---|---|---|
| Example 1 | good | good | good |
| Example 2 | good | good | good |
| Example 3 | good | good | good |
| Example 4 | good | good | good |
| Example 5 | good | good | good |
| Comparative Example C1 | has become stiff | | |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of materials crosslinkable with elimination of alcohols to give elastomers, wherein
    (A) at least one organopolysiloxane having at least two hydroxyl groups,
    (B) at least one silane of the formula $$RSi(OR^1)_3 \qquad (I),$$

in which each R independently is a methyl or vinyl radical and each $R^1$ may be identical or different and is a methyl or ethyl radical, and/or the partial hydrolysis products thereof, with the proviso that silanes of the formula (I) and/or the partial hydrolysis products thereof are used in amounts of at least 0.7 part by weight, based on 100 parts by weight of component (A),
    (C) an organosilicon compound which has at least one radical bonded to silicon via carbon, said radical further comprising basic nitrogen,
    (D) a tin catalyst,
    (E) optionally fillers, and
    (F) optionally stabilizers and are mixed with one another,
    (A) and (B) forming a reaction product with elimination of alkanol, with the proviso that the tin catalyst (D) is

TABLE 1

| Example | 1 | 2 | 3 | 4 | 5 | C1 |
|---|---|---|---|---|---|---|
| α,ω-Dihydroxypolydimethyl-siloxane 20,000 mPa · s | | 150 g | 150 g | 40 g | 40 g | |
| α,ω-Dihydroxypolydimethyl-siloxane 80,000 mPa · s | | | | 80 g | 80 g | 150 g |
| α,ω-Dihydroxypolydimethyl-siloxane 6,000 mPa · s | 150 g | | | | | |
| Vinyltrimethoxysilane | 8 g | 8 g | 4 g | | | 8 g |
| Methyltrimethoxysilane | | | | | 8 g | |
| Vinyltriethoxysilane | | | 4 g | 8 g | | |
| N-Aminoethylaminopropyl-triethoxysilane | 2 g | 2 g | 2 g | 2 g | 2 g | 2 g |
| Tin catalyst | 0.2 g | 0.2 g | 0.2 g | 0.2 g | 0.2 g | 0.2 g |
| Octylphosphonic acid | 0.5 g | 0.5 g | 0.5 g | 0.5 g | 0.5 g | 0.5 g |
| Pyrogenic silica[1] | | 30 g | 30 g | 30 g | 10 g | |
| Aluminum silicate[2] | 50 g | | | | 60 g | 50 g |
| Si-OH content on addition of the catalyst, based on the initial concentration | 47% | 48% | 55% | 42% | 44% | 69% |

[1]Pyrogenic silica having a BET surface area of 150 m²/g commercially available under the name "Wacker HDK V15" from Wacker-Chemie GmbH, Germany;
[2]Aluminum silicate commercially available under the name "Burgess Icecap K" from Omya GmbH, Cologne.

added to the component (A) or the mixture containing the reaction product thereof only when from 20 to 60% of the Si—OH groups originally present remain present.

2. The process of claim 1, wherein component (A) is a component of the formula

$$HO—[R^2_2SiO]_m—H \qquad (II)$$

in which each $R^2$ independently is an identical or different optionally substituted hydrocarbon radical and m is chosen so that the organopolysiloxane (A) has a viscosity of from 100 to 1,000,000 mPa·s at 25° C.

3. The process of claim 1, wherein component (A) is a component of the formula

$$HO—[R^2_2SiO]_m—H \qquad (II)$$

in which each $R^2$ independently is an identical or different optionally substituted hydrocarbon radical and m is chosen so that the organopolysiloxane (A) has a viscosity of from 500 to 250,000 mPa·s at 25° C.

4. The process of claim 1, wherein tin catalyst (D) is added to the component (A) or the mixture containing the reaction product thereof only when from 10 to 50% of the Si—OH groups originally present remain present.

5. The process of claim 2, wherein tin catalyst (D) is added to the component (A) or the mixture containing the reaction product thereof only when from 20 to 50% of the Si—OH groups originally present remain present.

6. The process of claim 3, wherein tin catalyst (D) is added to the component (A) or the mixture containing the reaction product thereof only when from 20 to 50% of the Si—OH groups originally present remain present.

7. The process as claimed of claim 1, wherein component (A), component (B), component (C), optionally fillers (E) and optionally further substances (G) are mixed with one another to give a premix, and then catalyst (D) and optionally stabilizer (F) are added, with the proviso that tin catalyst (D) is added to the premix only when from 20 to 60% of the Si—OH groups originally present are present.

8. The process as claimed of claim 1, wherein component (A), component (B), component (C), optionally fillers (E) and optionally further substances (G) are mixed with one another to give a premix, and then catalyst (D) and optionally stabilizer (F) are added, with the proviso that tin catalyst (D) is added to the premix only when from 20 to 50% of the Si—OH groups originally present are present.

9. The process of claim 1, wherein component (A), component (C), component (B), optionally fillers (E) and optionally further substances (G) are mixed with one another in this sequence to give a premix, and then catalyst (D) and optionally stabilizer (F) are added, with the proviso that tin catalyst (D) is added to the premix only when from 20 to 60% of the Si—OH groups originally present are present.

10. The process of claim 1, wherein component (A), component (C), component (B), optionally fillers (E) and optionally further substances (G) are mixed with one another in this sequence to give a premix, and then catalyst (D) and optionally stabilizer (F) are added, with the proviso that tin catalyst (D) is added to the premix only when from 20 to 50% of the Si—OH groups originally present are present.

11. The process of claim 1, wherein a single tin catalyst (D) is employed.

12. The process of claim 1, wherein component (B) is present in an amount by weight of 1.5 to 8.5 parts per 100 parts component (A).

13. The process of claim 1, wherein component (C) is present in an amount by weight 0.5 to 8.0 parts per 100 parts Component (A).

14. The process of claim 12, wherein component (C) is present in an amount by weight 0.5 to 8.0 parts per 100 parts Component (A).

* * * * *